F. GUNNING.
TRUCK.
APPLICATION FILED AUG. 14, 1914.
1,136,954.
Patented Apr. 27, 1915.
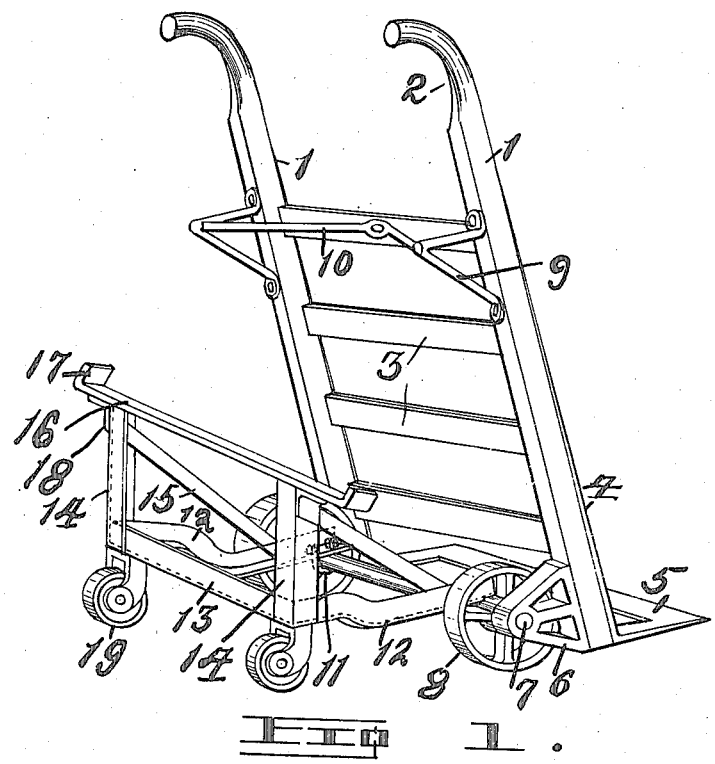
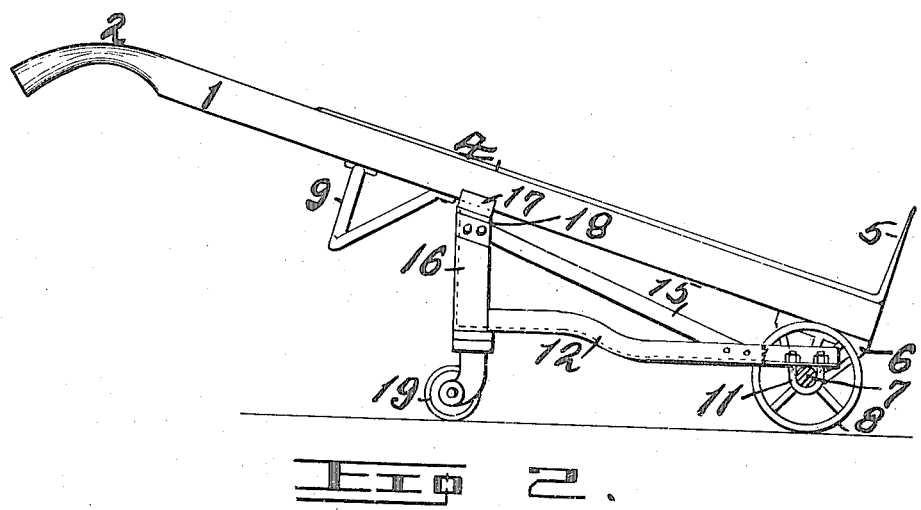
Witnesses
Jas. L. Butler
A. L. McClintock
Inventor
FREDERICK GUNNING.
By C. E. Humphrey
Attorney

UNITED STATES PATENT OFFICE.

FREDERICK GUNNING, OF TALLMADGE TOWNSHIP, SUMMIT COUNTY, OHIO, ASSIGNOR OF ONE-HALF TO HOWARD E. BENDER, OF AKRON, OHIO.

TRUCK.

1,136,954.

Specification of Letters Patent. Patented Apr. 27, 1915.

Application filed August 14, 1914. Serial No. 856,789.

*To all whom it may concern:*

Be it known that I, FREDERICK GUNNING, a citizen of the United States, residing at Tallmadge township, in the county of Summit and State of Ohio, have invented new and useful Improvements in Trucks, of which the following is a specification.

This invention relates to improvements in hand trucks used for transporting general merchandise and the object of the invention is to provide a truck which is equally as easy to manipulate for the loading and unloading operations as are the common hand trucks of commerce and which when in a loaded condition are capable of carrying a greater weight or load than are the common hand trucks for the reason that the weight of the load is borne by the truck and not by the operator.

More specifically, the invention comprises an attachment to an ordinary truck which serves to sustain the load on the truck and relieve the operator therefrom while permitting the same ease of manipulation as is possessed by the ordinary two wheel hand truck.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which comes within the scope of the matter hereinafter claimed.

In the drawings in which similar reference numerals indicate like parts in the different figures, Figure 1, is a perspective view of a hand truck embodying this invention, showing the same in its loading position; and, Fig. 2, is a side elevation of the same device showing the same in its loaded position.

Referring to the drawings in detail the reference numerals 1, 1 denote the stiles of an ordinary truck provided at one end with handles 2 and connected by cross bars 3. Secured to the upper faces of the stiles 1 are strips 4 connected by a cross-bar 5 wedge-shaped in cross section and used for insertion under a piece of merchandise. Secured to the under side of the stiles are bearings 6 in which is a transverse axle 7 on which are ground wheels 8. Also secured to the under side of the stiles 1 are a pair of legs 9 reinforced by braces 10. The foregoing is the ordinary hand truck of commerce and while different trucks may vary slightly in their general description, it is intended that the invention shall apply to all trucks of this general nature, in which the cross bar 5 is inserted under a piece of merchandise and the piece tipped back on the cross bars 3 and stiles 1 and the truck mainpulated by the handles 2.

In this construction, after the piece of merchandise has been tipped back on the truck, the larger portion of the weight of the merchandise is supported by the operator and in order to relieve the operator of this weight and enable the truck to carry a greater load, the following device is employed: Secured to the axle 7 by some means, such for instance, as U-bolts 11 are a pair of rearwardly-extending bars 12 between the opposite, widely-separated ends of which extends a cross bar 13 preferably arranged parallel with the axle 7. Extending upwardly from the ends of the cross bar 13 are a pair of posts 14. The posts 14 are reinforced by braces 15 extending to and connected with the rearwardly-extending bars 12. Supported on the upper ends of the posts 14 is a cross bar 16 constituting a support and preferably provided with upturned ends 17. The connections between the bar 16 and the posts 14 are usually reinforced by means of angle plates 18. Secured to the lower ends of the posts 14 are swiveled rollers 19. The bar 16 is preferably longer than the transverse width of the truck and is adapted to receive and support the stiles 1.

In operation, the operator raises the handles of the movable truck, as shown in Fig. 1, and inserts the cross bar 5 under the piece of merchandise and afterward tilts it back on the cross bars and stiles, as usual. The operator then lowers the handles 2 until the stiles 1 rest on the support 16 which transfers the weight of the load to the truck, and the parts assume the position shown in Fig. 2. It will be apparent from the foregoing that the operator is relieved from supporting the load on the truck, as it is supported by the rollers 19 and the truck can be readily wheeled to any convenient place and unloaded by simply raising the handles 2 in the ordinary manner. It is also apparent that the attachment can be applied to any ordinary construction of hand truck and be removed therefrom when desired, and yet when used in connection with the truck the user thereof is enabled to move loads greatly in excess of those which he would be capable of if the attachment was not used, thereby rendering the ordinary truck of greater service and capable of carrying greater loads than are the ordinary commercial trucks of commerce.

I claim:—

The combination with a truck having side stiles, an axle and ground wheels for the axle, of a rigid supporting frame pivotally connected with said axle and extending behind the same and provided with a ground wheel, and a cross-bar forming a portion of the frame and extending in a lateral direction sufficient to engage the stiles of the truck for supporting the latter.

In testimony whereof I have hereunto set my hand in presence of two subscribing witnesses.

FREDERICK GUNNING.

Witnesses:
HOWARD E. BENDER,
C. E. HUMPHREY.